(Model.)

C. H. LOW.
DRIVE CHAIN.

No. 245,081. Patented Aug. 2, 1881.

Witnesses
W. C. Corliss
Jno. C. MacGregor.

Inventor
Charles H. Low

By Coburn & Thacher
Attorneys

UNITED STATES PATENT OFFICE.

CHARLES H. LOW, OF SANDWICH, ILLINOIS, ASSIGNOR OF ONE-HALF TO J. PHELPS ADAMS, OF SAME PLACE.

DRIVE-CHAIN.

SPECIFICATION forming part of Letters Patent No. 245,081, dated August 2, 1881.

Application filed April 25, 1881. (Model.)

*To all whom it may concern:*

Be it known that I, CHARLES H. LOW, a citizen of the United States, residing at Sandwich, in the county of De Kalb and State of Illinois, have invented certain new and useful Improvements in Drive-Chains, which are fully set forth in the following specification, reference being had to the accompanying drawings, in which—

Figure 1:
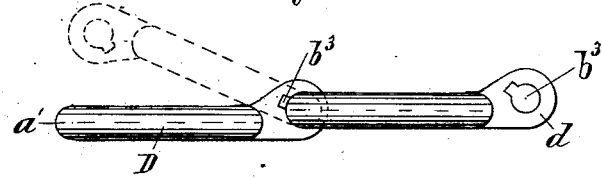
Figure 2:
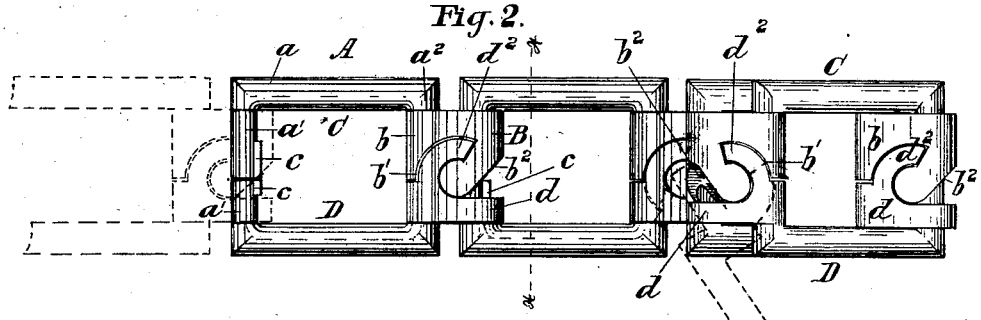
Figure 3:
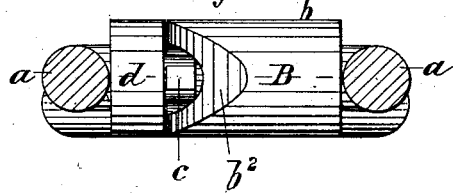
Figure 4:
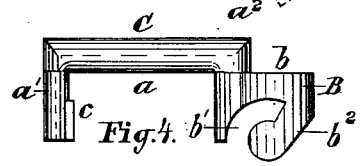
Figure 5:
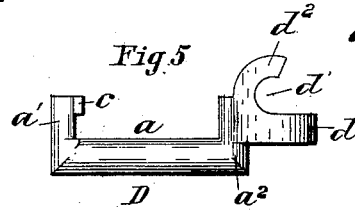
Figure 6:
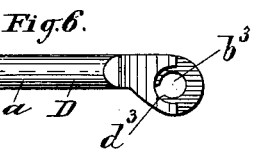

Figure 1 represents a side elevation of two links of a drive-chain embodying my improvements, one link being also shown, in dotted lines, turned over in position for detachment; Fig. 2, a plan view of a section of chain composed of my improved links, the link at one end being turned back in position for detachment; Fig. 3, a cross-section of a link on an enlarged scale, taken on the line $x\ x$, Fig. 2; Fig. 4, a plan view of one half of one of my links detached; Fig. 5, a similar view of the other half of the link; and Fig. 6, a side elevation of the last-named section.

My invention relates to drive-chains composed, either in whole or in part, of links that are detachable from each other.

The invention consists in constructing the link of two separate and independent parts, which are united by the act of coupling two links together.

It also consists in the special devices by means of which the links are formed and coupled.

The peculiar construction and operation of my improved links will be hereinafter fully described, and the special improvements which are believed to be new, and which it is desired to secure by Letters Patent, will be pointed out more definitely in the claims.

In the drawings, referring to Fig. 2, which shows a section of chain, A represents the complete links as they are seen in the chain when made up, and B the coupling-hook or projection at one end of each of the links. The outer end bar of the links is plain, except as hereinafter described, and the side bars are straight and plain. Each one of these links is composed of two separate and distinct pieces, C and D, each one of which constitutes one side of the link.

In Fig. 4 the side piece, C, is shown separate and detached. In this piece $a$ is the side bar of the link, and $a'$ one portion of the plain end bar, on the inside of which is a short spline, $c$. The section of the end bar, $a^2$, at the other end of the link carries one member, $b$, of the coupling device, by means of which two link-sections are united, and which are also adapted to receive the plain end bars. This coupling-section $b$ is substantially a tubular projection extending from the end-bar section. A curved slot or recess, $b'$, is cut in this section, beginning at the inside of the inner end and extending outward in both directions, as seen in Fig. 4 of the drawings. The inner end of this coupling-section is also beveled at $b^2$ on the outer edge of its inner end. A groove, $b^3$, is cut along the inner wall of the tubular opening in the coupling-section, this groove being inclined somewhat, as shown in the drawings, and extending from the outer end of section inward. The tubular opening is of a size adapted to receive the plain end bar at the other end of the link, and the groove conforms to the spline on that end bar.

In Fig. 5 the other side piece, D, is shown separate and detached. This member of the link has also a side bar, $a$, and at one end has a section, $a'$, provided with a short spline, $c$, corresponding to the same parts in the other member, C, of the link. The coupling-section $d$ of this member is similar to the section $b$ of the member C; but the central portion is cut out so as to form a curved recess, $d'$, adapted to receive the inner end of the coupling-section $b$, and the inner end of this coupling $d$ is curved, forming a kind of tongue, $d^2$, which is adapted to enter and fit the curved slot $b'$ in the section $b$. The extremity of this tongue is also recessed at $d^3$, to accommodate the end bar of the adjoining link when coupled. The outer end of the coupling-piece $d$ is tubular, like the section $b$, and has a groove, $b^3$, cut in it similar to the corresponding groove in the section $b$.

The operation of my improvement is as follows: In forming the links and coupling them together, two members necessary to constitute one link are first connected by inserting the tongue $d^2$ of one member in the curved recess of the companion member, thereby obviously making a link, and with the two members loosely connected. The two members of another link are then similarly joined and held over the first link, the two plain end-bar sections toward the coupling of the first. It will be seen that these ends may be separated without breaking the connection at the coupling end, the two sections of the coupling turning on each other. In this way the plain ends are opened wide enough to admit the coupling of the first link between them, when it will be found that the sections $a$ will slip into the openings in the ends of the coupling-sections, the splines thereon passing into the grooves in said openings. The end-bar sections are carried inward until the side bars strike the respective ends of the coupling, when it will be found that the splines have been carried past the slotted portion of each section, and will now form the link to be turned forward or straightened, thereby locking the coupling as soon as the splines have passed out of line with the grooves, and at the same time locking the two sections of the preceding link together. In this way link after link is added to make up the entire chain, or such parts thereof as is desired to provide with detachable links.

Whenever it is desired to detach a link the reverse operation is performed. One link is turned back upon the other, as shown in dotted lines in Fig. 1 of the drawings, and in full lines in Fig. 2, when it will be found that the sections of this link may be spread apart at the plain ends, as shown in dotted lines at Fig. 2, thereby uncoupling the links. The curved form of the tongues and grooves of the coupling-sections and the bevel $b^2$ permits this spread of the two sections for uncoupling and coupling the links.

Some slight changes may be made in the construction and relation of some of these parts without materially affecting the principle of operation.

It is obvious that a chain made up with these links will be very free, and yield in different directions to a much greater extent than a chain composed of stiff links. Some difficulty has been experienced in the use of chains composed of stiff links, whether detachable or not, on account of the stiffness of the chain occasioning binding in passing over the rag-wheel. With my improved links there is just enough yielding of the sections independently of each other to avoid this difficulty and to make the chain a little more flexible. The link-sections are readily cast separate from each other, and are put together with great facility. And it will be noticed that on one side the coupling does not extend beyond the plane of the side bars of the link, and on the other side extends but little beyond the plane of the side bars, which is an additional point in favor of these links when in operation.

Having thus described my invention, what I claim as new, and desire to secure by Letters Patent, is—

1. Detachable links for drive-chains, each composed of two separate longitudinal sections, which are provided at one end with curved projections and correspondingly-curved recesses, respectively, and at the other end with straight end-bar projections, whereby the sections are connected directly to each other and locked to form the links, and at the same time adjacent links are directly coupled together, substantially as described.

2. The section C, provided with coupling-section $b$, having a curved recess, $b'$, in combination with the section D, provided with coupling-section $d$, having a curved tongue, $d^2$, whereby the two sections are connected, substantially as described.

3. In a link for drive-chains, the section C, provided with a coupling, $b$, at one end, constructed substantially as specified, and a straight section provided with a spline, $c$, at the other end, in combination with the section D, having a coupling-section, $d$, at one end, constructed substantially as specified, and a corresponding straight section and spline, $c$, at the other end, whereby the links may be formed and coupled or uncoupled at pleasure, substantially as described.

CHARLES H. LOW.

Witnesses:
C. C. JONES,
GEO. J. LOW.